United States Patent
Paulus et al.

(10) Patent No.: US 10,246,140 B2
(45) Date of Patent: Apr. 2, 2019

(54) SPOILER DEVICE AND METHOD

(71) Applicant: Dr. Ing. h.c. F. Porsche Aktiengesellschaft, Stuttgart (DE)

(72) Inventors: Chris Paulus, Calw-Stammheim (DE); Christoph Schenk, Rutesheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/415,896

(22) Filed: Jan. 26, 2017

(65) Prior Publication Data
US 2017/0217508 A1 Aug. 3, 2017

(30) Foreign Application Priority Data
Jan. 28, 2016 (DE) .................. 10 2016 101 521

(51) Int. Cl.
*B62D 35/00* (2006.01)
(52) U.S. Cl.
CPC .................. *B62D 35/007* (2013.01)
(58) Field of Classification Search
CPC ..................... B62D 35/007; B62D 35/001
See application file for complete search history.

(56) References Cited

U.S. PATENT DOCUMENTS

| | | | |
|---|---|---|---|
| 4,810,022 | A | 3/1989 | Takagi et al. |
| 6,431,639 | B2 | 8/2002 | Yoon |
| 2001/0052717 | A1 | 12/2001 | Yoon |
| 2007/0063541 | A1 | 3/2007 | Browne et al. |
| 2015/0149046 | A1 | 5/2015 | Jeong |

FOREIGN PATENT DOCUMENTS

| | | | |
|---|---|---|---|
| CN | 1328929 A | 1/2002 | |
| CN | 101312873 A | 11/2008 | |
| DE | 10348285 A1 * | 5/2005 | ........... B62D 35/005 |
| DE | 10348285 A1 | 5/2005 | |
| DE | 102006009048 B4 | 9/2007 | |
| JP | 2002029459 A | 1/2002 | |

* cited by examiner

*Primary Examiner* — D Glenn Dayoan
*Assistant Examiner* — Melissa A Black
(74) *Attorney, Agent, or Firm* — Leydig, Voit & Mayer, Ltd.

(57) ABSTRACT

A method for adjusting a spoiler unit of a spoiler device of a motor vehicle from a first position into a second position includes determining a characteristic value for a positional difference between the first position and the second position and deriving, as a function of the characteristic value, a travel speed of the spoiler unit.

18 Claims, 1 Drawing Sheet

SPOILER DEVICE AND METHOD

CROSS REFERENCE TO RELATED APPLICATIONS

This application claims benefit to German Patent Application No. DE 10 2016 101 521.0 filed Jan. 28, 2016, which is hereby incorporated by reference herein.

FIELD

The present invention relates to a spoiler device, in particular for a motor vehicle, and to a method for adjusting a spoiler unit.

BACKGROUND

The prior art has disclosed setting spoiler units of spoiler devices as a function of the current driving situation. In this context, the adjustment devices of aerodynamic effective equipment or the spoiler units of a motor vehicle can be actuated automatically.

DE 10 2006 009 048 B4 discloses, for example, an air-guiding device for a vehicle, which device comprises an adjustable spoiler element and a servo drive with at least one drive motor. A coupling linkage is pivotably articulated by means of a threaded spindle, which is axially secured, rotatably mounted and driven by means of the drive motor and on which a spindle nut is seated. In order to precisely position the spoiler element, the drive motor is connected to a Hall sensor system. A worm drive, via which the threaded spindle is connected to a driveshaft of the drive motor, serves as a drive. This gives rise to a self-locking system. Alternatively, the threaded spindle can be connected to the drive motor via a drive belt. The transmission ratio between the drive motor and the threaded spindle can then be predefined by means of corresponding pulley wheels.

DE 103 48 285 A1 has disclosed automatic actuation of adjustment devices of aerodynamically effective equipment for motor vehicles. Here, the adjustment devices are driven by means of an electric motor which is supplied with direct current via the vehicle battery and a transmission which is connected downstream of said electric motor, and the actuation of the adjustment devices is carried out as a function of different parameters such as the driving speed, the deceleration or acceleration of the motor vehicle. In order to improve the actuation, a program is stored in the characteristic diagram of the internal combustion engine, which program contains an adjustment and positioning characteristic for at least one of the aerodynamically effective pieces of equipment of the motor vehicle. In each case the current position of, for example, a rear spoiler can be detected by means of Hall signal transmitters or by detecting and transmitting the rotational rates, and the position of the rear spoiler can be respectively set as a function of the current driving conditions.

SUMMARY

In an embodiment, the present invention provides a method for adjusting a spoiler unit of a spoiler device of a motor vehicle from a first position into a second position. The method includes determining a characteristic value for a positional difference between the first position and the second position, and deriving, as a function of the characteristic value, a travel speed of the spoiler unit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
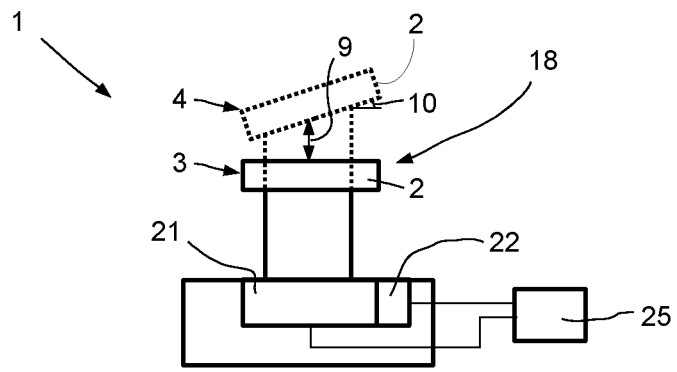
FIG. 1 shows a highly simplified and schematic illustration of a spoiler device according to an embodiment of the invention.

An improved method for adjusting a spoiler unit of a spoiler device and an improved spoiler device, in particular for a motor vehicle, are described herein.

A method according to an embodiment of the invention serves to adjust a spoiler unit of a spoiler device, in particular of a motor vehicle. In this context, the spoiler unit is transferred from a first position into a second position. A characteristic value for a positional difference between the first position (as a current position or starting position) and the second position is determined. A travel speed of the spoiler unit is derived and, in particular, set as a function of the characteristic value.

The method according to an embodiment of the invention has many advantages. A considerable advantage of the method according to an embodiment of the invention is that, in particular, before or even essentially before the start of the adjustment a characteristic value is determined for a positional difference between the first position and the second position. A travel speed of the spoiler unit is then derived as a function of this characteristic value and, in particular, set. This means that the travel speed of the spoiler unit depends on the characteristic value and therefore on the positional difference between the first position and the second position.

Basically, it is also possible that in the case of a planned change in position from a first position to a second position, the change in position is started directly with a predetermined travel speed, and that in parallel with this, or directly subsequent thereto after the start, a positional difference between the then current position and the second position is determined, and that a travel speed of the spoiler unit is then stored as a function of the positional difference, and then set.

The travel speed is determined according to an embodiment of the invention and subsequent thereto preferably predefined. The terms first position and second position are to be understood as meaning according to the present invention different positions which differ considerably. An embodiment of the invention is not concerned with adjusting a predefined position but rather with setting significantly different positions for, for example, different driving conditions.

Different driving conditions are basically present, for example, in the case of a journey through town and in the case of a journey in the countryside and/or in the case of a journey on a freeway. In this context, it can typically be assumed that the speed at which the vehicle travels in town is considerably lower than on a country road, where it may in turn be considerably lower than on an open stretch on a freeway. In addition to the current speed, it is, however, also possible for the current curve situation to play a role. Furthermore, further factors may also be included in the calculations such as ambient conditions, etc.

Actually, with the method according to an embodiment of the invention, the spoiler device or the spoiler unit of the spoiler device is to be transferred from a first position into a second position which is better suited for the then current driving conditions.

The characteristic value is preferably higher if the positional difference is greater. In one preferred development, the derived travel speed is also higher if the positional difference is greater. The derived travel speed can be set incrementally or continuously. The travel speed which is to be set is preferably determined in such a way that it is always lower than a predefined maximum travel speed.

It is preferred that the positional difference is determined from at least one travel distance and/or at least one travel angle. It is possible that only one travel distance or only one travel angle is taken into account. It is possible and preferred, in particular, that at least one travel distance and at least one travel angle are determined and taken into account. For example, a spoiler unit can be extended and changed in its angle position. A plurality of combined travel distances and pivoting movements are also possible.

In preferred developments, a current travel speed in an initial range of an adjustment is lower than in a central range of the adjustment. This means that at the start of an adjustment preferably a lower travel speed is predefined. The travel speed which currently acts during the adjustment is then preferably increased to the derived travel speed when the central range of the adjustment is reached.

In simple cases, a first low travel speed is set in an initial range at the start of the adjustment. It is also possible and preferred to provide a starting ramp in the initial range. The travel speed is then preferably increased to at least essentially the previously determined derived travel speed over the time period of the starting ramp. The increase in the travel speed can be increased linearly from 0 to the derived travel speed. Other curve profiles are also possible.

In preferred developments, a current travel speed in an end range of an adjustment is lower than in a central range. The current travel speed is particularly preferably reduced in an end range at the end of the adjustment. The reduction can take place continuously or incrementally. In particular, the end range is close to the second position. It is possible that the travel speed is reduced along a braking ramp. The travel speed can be reduced to a specific value. Or the travel speed is reduced as far as the minimum travel speed and then directly reduced to zero when the second position is reached. A linear curved profile or else some other curved profile of the derived travel speed is possible in the central range up to a complete stop when the second position is reached. An overshoot process can be taken into account in the calculation of the profile of the travel speed.

In advantageous developments, the derived travel speed is set at least essentially in the central range. In particular, in the central range the travel speed remains at the value of the derived travel speed at least in certain sections.

A current travel speed in the end range and/or in the initial range of the adjustment is preferably higher than a minimum speed. The minimum speed can result, in particular, from the drive which only ensures a reliable function at a minimum rotational speed or the like.

It is particularly preferred that a travel speed is set by means of pulse width modulation. For example the voltage supply of the drive device is periodically switched on and off. The periodic switching process occurs with such a high frequency that the drive device detects only the effective mean value or has said mean value transmitted to it. In this way, any effective voltage and therefore, within wide limits, any travel speed can be set by means of a ratio of the on phases and the off phases.

A change in a travel speed preferably takes place continuously between the minimum speed and the derived travel speed. The change, i.e. the acceleration or the braking, of the travel speed can occur linearly with flattened ends or in an S shape, with the result that gentle transitions occur between the individual speed ranges.

It is particularly preferred that at least one measure for a current position of the spoiler unit is determined periodically. Such a measure for a current position can be determined, for example, by means of a position sensor which outputs the current position. It is also possible that a measured value from which a current position of the spoiler unit can be derived is detected by means of an assigned sensor. However, it is also possible that the position is respectively inferred by detection of the operating processes without a direct sensor. For example, by detecting the rotational speeds and the corresponding time periods in which the corresponding rotational speeds are present it is possible to infer a position of the spoiler unit. Any positioning errors which creep in can be excluded by means of a limit switch or the like.

It is advantageous if the end range comprises a braking section. The braking section preferably extends over a predefined positional difference. Within the braking section, the spoiler unit is preferably adjusted with a minimal speed and, for example, the minimum speed. As a result, the spoiler unit is moved at a low speed towards the end of the end range, as a result of which relatively low noise is produced and also a better acoustic is achieved during the movement of the spoiler unit.

The braking section can define a predefined angular range or a predefined distance. It is possible that the positional difference of the braking section is also dependent on the derived travel speed. It is therefore possible, given a high derived travel speed, for the braking section to be selected to be, for example, longer than in the case of a low derived travel speed at which basically also only a relatively short braking distance is necessary to brake the spoiler unit.

A spoiler device according to an embodiment of the invention is provided, in particular, for a motor vehicle and comprises at least one spoiler unit, at least one drive device for adjusting the spoiler unit, at least one sensor device for detecting a measure for a current position of the spoiler unit and an assigned control device for actuating the drive device. In this context, the control device is configured and designed to determine, during an adjustment of the spoiler unit from a first position into a second position, in particular initially, a characteristic value for a positional difference between the first position and the second position, and to derive a travel speed of the spoiler unit as a function of the characteristic value.

The spoiler device according to an embodiment of the invention also has many advantages. The spoiler device can also comprise a plurality of spoiler units which can also each be referred to as air guiding devices or aerodynamic active pieces of equipment.

Embodiments of the invention make available overall an advantageous spoiler device and an advantageous method for adjusting at least one spoiler unit of a spoiler device. Embodiments of the invention may make it possible to improve the quality level, and improved acoustics and a more harmonic movement sequence of a spoiler unit can be achieved. In this context, for example the rotational speed of a drive device is regulated as a function of the distance to be traveled or the positional difference between the first or current position and the second position which is to be aimed for. Expressed in simple terms, a large adjustment distance is traveled through at a high speed, and a small adjustment distance is traveled through at a relatively low speed.

Slow starting and slow braking preferably take place at the initial range and in the end range. As a result, in particular also a reduction in adjustment noises is achieved at the mechanical parts of the spoiler device. Therefore, when a transmission is used, for example less noise is produced as a result of soft engagement of the transmission teeth. At the same time, in particular regulation of the rotational speed in order to ensure the rotational speed profile is superimposed. In simple cases, a travel speed and, in particular, a rotational speed are selected as a function of the positional difference between the second position and the first position at the start of the travel process.

Overall, a harmonic movement of the spoiler unit of the spoiler device is produced, since the travel speed or rotational speed is adapted to the distance to be traveled or the positional difference.

If a plurality of spoiler units or spoiler devices are used, the same procedure can be adopted with the corresponding spoiler units of the corresponding spoiler devices.

An optimum travel speed can be respectively currently set in a simple way by regulating the travel speed by means of a pulse width modulation method.

An exemplary embodiment of the invention will be explained in more detail below with reference to FIGS. 1 to 3. FIG. 1 shows a highly schematic view of a basic illustration of a spoiler device 1, which has an adjustable spoiler unit 2 here.

In order to adjust the spoiler unit 2 from the first position 3 represented by a continuous line into the second position 4 represented by a dashed line, an, in particular, electric drive device 21 is used. The current position of the spoiler unit 2 is detected by a sensor device 22. Both the sensor device 22 and the drive device 21 are connected to a control device 25 here. The control device can be integrated into the spoiler device 1. It is also possible that the control device 25 is only assigned and serves, in particular, as a central control device of the motor vehicle.

Here, FIG. 1 illustrates a spoiler unit 2 which, during the movement from the first position 3 into the second position 4 is shifted by a travel distance 9 and at the same time—or afterwards—is pivoted about a travel angle 10. It is also possible that a plurality of, for example, linear travel distances and a plurality of pivoting movements are carried out or are necessary in order to move the spoiler unit 2 from the first position 3 into the second position 4.

In the position illustrated in FIG. 1, the spoiler unit 2 is in the first position 3 which in this case is now the current position 18. After the movement of the spoiler unit 2 into the second position 4 the spoiler unit 2 is in the second position 4, which is then the current position 18.

Figure 2:
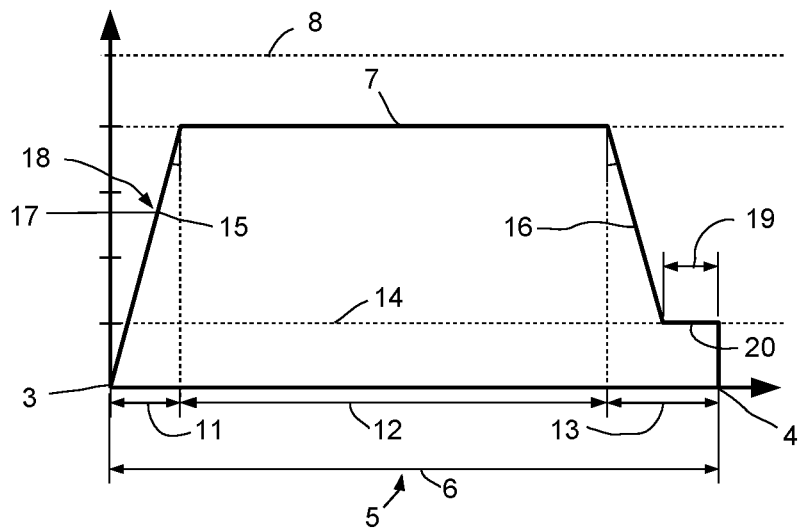
FIG. 2 shows a highly schematic diagram of a time profile of travel speed during an adjustment movement according to an embodiment of the invention.

The movement of the spoiler unit 2 from the first position 3 into the second position 4 is explained in more detail with respect to FIG. 2. According to an embodiment of the invention, a positional difference 6 is detected if the spoiler unit 2 is to be moved from a first position 3 into a second position 4. This may be the case, for example, if the current driving situation changes and another position of the spoiler unit 2 is more favorable for better aerodynamics and/or for increasing the driving safety or for improving the driving properties.

The control device 25 then evaluates the current position, that is to say the first position 3, and the aimed-for position, specifically the second position 4, and derives a positional difference 6 from the first position 2 and the second position 3. A representative characteristic value 5 is formed for this positional difference 6 and is used to determine the travel speed 7 which is to be set.

Specifically, in the case of a relatively large positional difference 6, a higher travel speed 7 is derived than in the case of a relatively small positional difference 6. This means that the spoiler unit 2 is moved with a relatively high travel speed 7 if the second position 4 is far away from the first position 3. The spoiler unit 2 is, in contrast, moved at a relatively low speed if the second position 4 is arranged near to the first position 3. As a result, harmonic movement sequences arise and less noise is produced.

Here, in addition the current travel speed 17 is additionally increased continuously in the initial range 11. The current travel speed can be increased from 0 or else from the minimum speed 14. In simple cases, the travel speed in the initial range 11 is increased linearly up to the derived travel speed 7 which is to be set, and which is then reached at the end of the initial range 11.

In the illustrated exemplary embodiment, the travel speed remains constant inside the central range 12 until the end range 13 is reached. Then, the current travel speed is braked. The current travel speed can be reduced linearly to zero in the end range 13. It is also possible that the current travel speed 18 is reduced linearly to the minimum speed 14 and remains constant there for a braking section 19.

The braking section has, in particular, a fixed and predefined length or positional difference 20, with the result that the start of the end range 13 results from the derived travel speed 7, via the positional difference 20 and the rate of change 16 (braking). It is also possible to brake to a travel speed of zero without traveling through the range "19"/"20" and via the rate of change (ramp) "16".

In the case of a relatively small positional difference 6 between the first position 3 and the second position 4, a relatively low travel speed is determined in the central range 12. As a result, different travel speeds 7 are derived as a function of the distance to be traveled. In the case of relatively large distances, a relatively high travel speed is derived, and in the case of relatively short distances a relatively low travel speed is derived.

Figure 3:
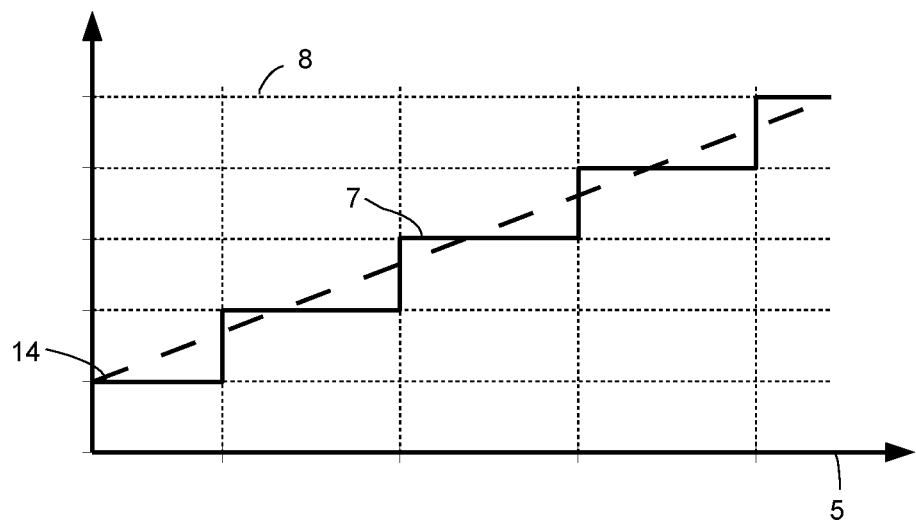
FIG. 3 shows a schematic diagram with the derived travel speed plotted against the positional difference according to an embodiment of the invention.

FIG. 3 shows 2 simple examples for the determination of a derived travel speed 7. A diagram with the travel speed plotted against the positional difference at the start of an adjustment is illustrated. A curve of the travel speed 7 which is to be set plotted against the adjustment distance which is present at the start of the adjustment or the positional difference is shown by a continuous line. Here, the curve progresses incrementally and starts with the minimum speed 14, which is necessary, for example, to ensure a reliable rotational movement of the drive motor. If the positional difference reaches a specific amount, the travel speed is raised to a second stage etc.

A variant in which a straight line has been drawn through the initial point and end point of the continuous line is represented by dashes. A corresponding travel speed 7 then occurs at the positional difference 6. The positional difference 6 can be used directly as a characteristic value 5. It is also possible to classify the positional difference 6 in order to determine characteristic values 5.

Overall, an advantageous spoiler device and an advantageous method for setting the spoiler device are obtained, wherein in each case an appropriately fast adjustment of the spoiler unit takes place from a currently present first position to a second position. In this context, the adjustment is faster the larger the distance to be traveled. In the case of short adjustment distances, an adjustment takes place with appropriately low speeds in order to avoid abrupt changes in movement.

At the start and at the end of the adjustment process, the speed is respectively gently increased or gently reduced, therefore improving the quality level and the acoustics, for example during the movement of a rear spoiler.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for adjusting a spoiler unit of a spoiler device of a motor vehicle from a first position into a second position, the method comprising:
    determining a characteristic value for a positional difference between the first position and the second position;
    deriving, as a function of the characteristic value, a travel speed at which the spoiler unit is to be moved between the first position and the second position; and
    transferring the spoiler unit between the first position and the second position at the derived travel speed.

2. The method of claim 1, wherein an increased positional difference results in an increased derived travel speed.

3. The method of claim 1, wherein the positional difference is determined from at least one travel distance between the first position and the second position and/or at least one travel angle between the first position and the second position.

4. The method of claim 1, wherein the transferring the spoiler unit between the first position and the second position at the derived travel speed includes:
    transferring, in an initial range between the first position and the second position, the spoiler unit one or more initial travel speeds, and
    transferring, in a central range between the first position and the second position, the spoiler unit at one or more central travels speeds,
    wherein the one or more initial travel speeds are lower than the one or more central travel speeds.

5. The method of claim 1, wherein the transferring the spoiler unit between the first position and the second position at the derived travel speed includes:
    transferring, in a central range between the first position and the second position, the spoiler unit at one or more central travels speeds, and
    transferring, in an end range between the first position and the second position, the spoiler unit at one or more end travel speeds,
    wherein the one or more end travel speeds are lower than the one or more central travel speeds.

6. The method of claim 1, wherein the transferring the spoiler unit between the first position and the second position at the derived travel speed includes transferring, in a central range between the first position and the second position, the spoiler unit at the derived travel speed.

7. The method of claim 1, wherein the transferring the spoiler unit between the first position and the second position at the derived travel speed includes:
    transferring, in an initial range between the first position and the second position, the spoiler unit one or more initial travel speeds, and
    transferring, in an end range between the first position and the second position, the spoiler unit at one or more end travel speeds,
    wherein the one or more initial travel speeds and the one or more end travel speeds are higher than a minimum speed.

8. The method of claim 1, wherein the transferring the spoiler unit between the first position and the second position at the derived travel speed includes setting a current travel speed by pulse width modulation.

9. The method of claim 1, wherein the transferring the spoiler unit between the first position and the second position at the derived travel speed includes:
    initially transferring the spoiler unit at a minimum speed, and
    continuously changing the travel speed from minimum speed to the derived travel speed.

10. The method of claim 1, further comprising periodically determining a current position of the spoiler unit.

11. The method of claim 1, wherein an end range between the first position and the second position includes a braking section.

12. The method of claim 11, wherein the braking section has a predefined positional difference.

13. A spoiler device for a motor vehicle, comprising:
    at least one spoiler unit;
    at least one sensor device configured to measure a current position of the spoiler unit;
    an assigned control device configured to:
        actuate the drive device,
        determine a characteristic value for a positional difference between the current position of the spoiler unit and a second position, and
        derive, as a function of the characteristic value, a travel speed at which the spoiler unit is to be moved between the current position and the second position; and
    at least one drive device configured to transfer the spoiler unit between the current position and the second position at the derived travel speed.

14. The method according to claim 7, wherein the one or more initial travel speeds and the one or more end travel speeds are less than the derived travel speed.

15. The method according to claim 1, wherein the transferring the spoiler unit between the first position and the second position at the derived travel speed includes transferring the spoiler unit in an initial range between the first position and the second position at a time-varying initial travel speed,
   wherein the time-varying initial travel speed increases from zero to the derived travel speed.

16. The method according to claim 1, wherein the transferring the spoiler unit between the first position and the second position at the derived travel speed includes transferring the spoiler unit in an end range between the first position and the second position at a time-varying end travel speed,
   wherein the time-varying end travel speed decreases from the derived travel speed to zero.

17. The method according to claim 15, wherein the time-varying initial travel speed increases directly from zero to a minimum travel speed and then increases continuously from the minimum travel speed to the derived travel speed.

18. The method according to claim 16, wherein the time-varying end travel speed decreases from the derived travel speed to a minimum travel speed and then decreases directly to zero when the second position is reached.

* * * * *